United States Patent
Yang

[11] Patent Number: 5,984,224
[45] Date of Patent: Nov. 16, 1999

[54] CABLE-SPOOLING CASING FOR EARPHONES

[75] Inventor: Bill Yang, Taipei, Taiwan

[73] Assignee: Cotron Corporation, Taipei, Taiwan

[21] Appl. No.: 09/178,016

[22] Filed: Oct. 23, 1998

[30] Foreign Application Priority Data

Jul. 21, 1998 [TW] Taiwan ................................ 87211794

[51] Int. Cl.⁶ ................................................ B65H 75/28
[52] U.S. Cl. .................. 242/400.1; 242/402; 242/404.2; 242/405.2; 242/407
[58] Field of Search ................................ 242/400.1, 402, 242/405.1, 405.2, 404.3, 404.2, 407, 407.1

[56] References Cited

U.S. PATENT DOCUMENTS

| | | | |
|---|---|---|---|
| 226,367 | 4/1880 | Steen | 242/407 X |
| 1,910,597 | 5/1933 | Elliot | 242/404.3 |
| 2,938,514 | 5/1960 | Berg | 242/400.1 X |
| 3,705,697 | 12/1972 | Chagnon | 242/405.1 X |
| 3,907,236 | 9/1975 | Sims, Jr. | 242/405.1 X |
| 3,926,383 | 12/1975 | McConnell | 242/405.1 |
| 4,467,979 | 8/1984 | Koehler | 242/402 X |
| 4,802,638 | 2/1989 | Burger et al. | 242/388.1 |
| 5,339,461 | 8/1994 | Luplow | 455/351 |
| 5,727,745 | 3/1998 | Vara | 242/400.1 |

FOREIGN PATENT DOCUMENTS

| | | | |
|---|---|---|---|
| 12698 | 3/1934 | Australia | 242/407 |
| 559625 | 9/1932 | Germany | 242/407.1 |
| 139492 | 3/1953 | Sweden | 242/405.2 |

*Primary Examiner*—Donald P. Walsh
*Assistant Examiner*—Minh-Chau Pham
*Attorney, Agent, or Firm*—Jiawei Huang; J. C. Patents

[57] ABSTRACT

A cable-spooling casing is suitable for completely or partially spooling transmission cables of earphone for easy carriage. The cable-spooling casing includes a first spooling guide having a first protuberance on its interior surface and a plurality of slots around its perimeter. There is also a second spooling guide having a second protuberance on its interior surface, such that when the first protuberance of the first spooling guide is joined to the second protuberance of the second spooling guide, a groove for spooling cable is formed in the middle. There is at least one clip on the exterior surface of the first cable-spooling guide for fixing the earphone transmission cable in place and at least one back clamp on the exterior surface of the second cable-spooling guide for clamping the cable-spooling casing onto any item worn by a user.

16 Claims, 3 Drawing Sheets

CABLE-SPOOLING CASING FOR EARPHONES

CROSS-REFERENCE TO RELATED APPLICATION

This application claims the priority benefit of Taiwan application serial no. 87211794, filed Jul. 21, 1998, the full disclosure of which is incorporated herein by reference.

BACKGROUND OF THE INVENTION

1. Field of Invention

The present invention relates to a cable-spooling casing. More particularly, the present invention relates to a casing capable of spooling up the entire length of an earphone's transmission cables for easy carriage and providing an optimal length of transmission cable for individual user's listening needs.

2. Description of Related Art

As electronic industry continues to flourish, the number of miniaturized and lightweight electrical appliances increases exponentially. People can carry these small electrical appliances, for example, a Walkman or a CD player, around while mobile and in the midst of their daily lives. They can listen to music through earphones any time and any place without having to worry about interfering with other people. Nowadays, a hands-free type of mobile telephones is also available so that people can talk to each other through an earphone-microphone set as well.

At present, the earplug type of earphone is still one of the most commonly used products. Most Walkmans, call beepers, or mobile telephones use earplugs because earplugs are lightweight and easy to handle. However, when a user is using an earplug type of earphone, the user's body frequently becomes entangled with the earphone transmission cables during minor movements. Sometimes an earplug is pulled out of the ear and then dropped on the floor. Besides causing some discomfort to the user's ear, frequently dropping the earplug may damage the earphone. Furthermore, a long transmission cable dangling down the ear can cause great inconveniences such as the possibility of interfering with the movement of hands and feet.

In light of the foregoing, there is a need to provide a cable-spooling casing for spooling up redundant cable.

SUMMARY OF THE INVENTION

Accordingly, the present invention provides a cable-spooling casing for spooling up earphone transmission cable so that earplugs are not so easily pulled out of the ears, so as to avoid discomfort to the user's ears and prevent damage to the earphone that may occur when it is dropped on the floor. Moreover, the transmission cable is not so readily entangled with hands and feet.

In another aspect, this invention provides a cable-spooling casing that permits easy adjustment of the length of transmission cables so that the earphone can be used more conveniently.

To achieve these and other advantages and in accordance with the purpose of the invention, as embodied and broadly described herein, the invention provides a cable-spooling casing suitable for completely spooling up earphone transmission cables for easy carriage and for adjusting the length of loose transmission cables outside the spool casing for accommodating an individual user. The cable-spooling casing includes a first spooling guide having a first protuberance on its interior surface and a plurality of slots around its perimeter and a second spooling guide having a second protuberance on its interior surface, such that when the first protuberance of the first spooling guide is joined to the second protuberance of the second spooling guide, a groove for spooling cable is formed. There is also at least one clip on the exterior surface of the first cable-spooling guide for fixing the earphone transmission cable and at least one clamp on the exterior surface of the second cable-spooling guide for clamping the cable-spooling casing onto any item worn by a user.

This invention relies on the clip on the exterior surface of the first cable-spooling guide to grip one part of the transmission cable so that the dislodgment of transmission cable from the casing is prevented. Furthermore, the invention relies on the clamp on the exterior surface of the second cable-spooling guide to clamp the casing onto any item worn by the user. Finally, the invention uses the slots at the perimeter of the first cable-spooling guide to fix the position of the transmission cable coming out from the spool, thus preventing side movement of the transmission cable.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
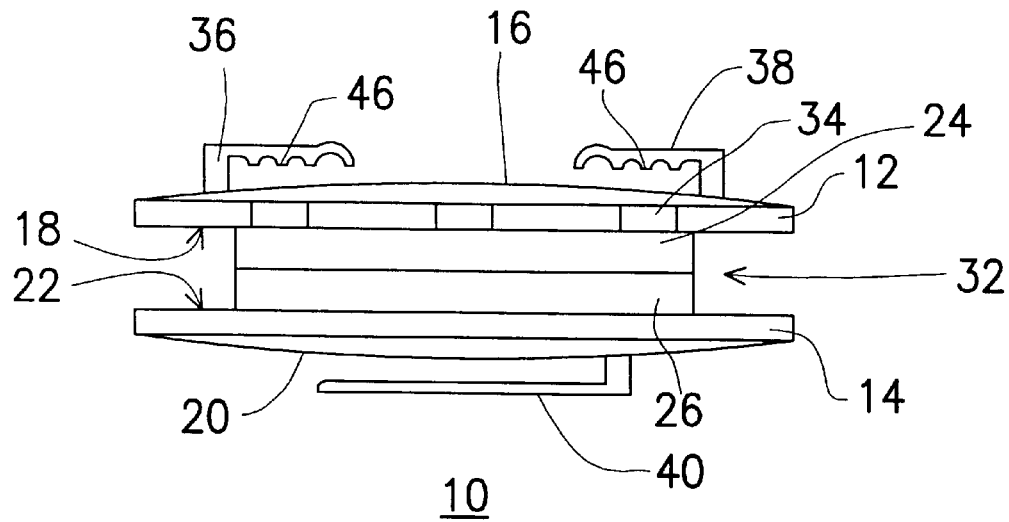
FIG. 1 is a schematic drawing of a front view of a cable-spooling casing for spooling earphone transmission cable according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
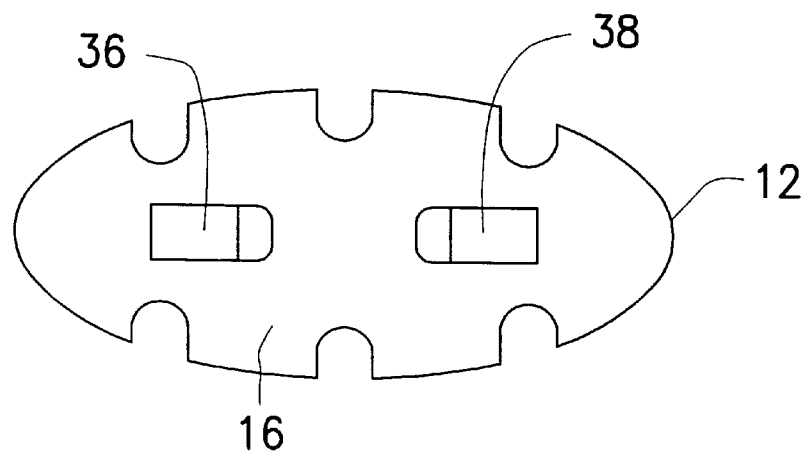
FIG. 2 is a schematic drawing of a top view of the cable-spooling casing for spooling earphone transmission cable as shown in FIG. 1.
Figure 3:
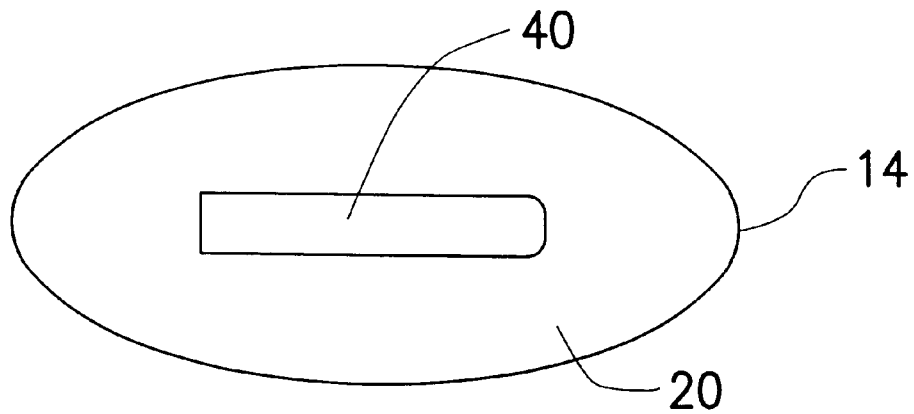
FIG. 3 is a schematic drawing of a bottom view of the cable-spooling casing for spooling earphone transmission cable as shown in FIG. 1.

FIGS. 1, 2 and 3 are the respective front view, top view and bottom view of a cable-spooling casing for spooling earphone transmission cable according to one preferred embodiment of this invention.

The cable-spooling casing 10 of this invention comprises cable-spooling guides 12 and 14. The cable-spooling guide 12 has an exterior surface 16 and an interior surface 18, and the cable-spooling guide 14 similarly has an exterior surface 20 and an interior surface 22. The cable-spooling guide 12 and the cable-spooling guide 14, respectively shown in FIG. 2 and FIG. 3, may both be of the same size or different sizes, and may have an oval shape, a rectangular shape or any other suitable shape.

The interior surfaces 18 and 22 of the respective guides 12 and 14 have protuberances 24 and 26, respectively, such that the size of the protuberance 24 corresponds with the size of the protuberance 26. The guide 12 is joined to the guide 14 through their respective protuberances 24 and 26. The guides 12 and 14 together with their protuberances form the main body of the cable-spooling casing with a cable-spooling groove 32 in the middle for spooling up transmission cable of the earphone. In addition, the guide 12 has a plurality of slots 34 on its perimeter for positioning the transmission cable coming out from the spool.

Figure 4:
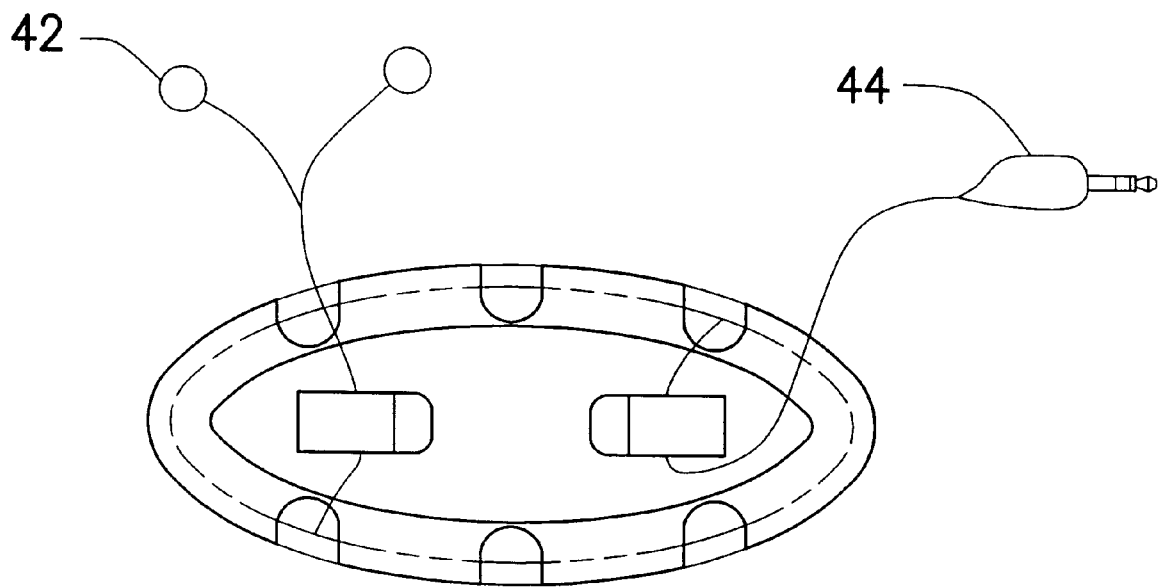
FIG. 4 is a schematic drawing of a sketch of the cable-spooling casing showing transmission cable wrapped around its spooling groove with each outlet end passing out from the spool through a slot and the position of the transmission cable near the plug's and the earplug's ends each fixed by a clip to the casing.

At least one clip is installed on the exterior surface 16 of the guide 12. For example, two clips 36 and 38 having their opening ends facing each other are mounted onto the exterior surface 16. The clip 36 and clip 38 can be used to fix the location of the transmission cable coming out from the spool near the earphone's end 42 and the plug's end 44, respectively. FIG. 4 is a sketch of the cable-spooling casing showing transmission cable wrapped around its spooling groove with each outlet end passing out from the spool through a slot. The transmission cable near the plug end and the earplugs end are each fixed by a clip to the casing. The earphone cable can be freely wound to the spooling groove 32 (FIG. 1) on the protuberances 24, 26. The two ends 42, 44 of the earphone cable are respectively fixed on the clips 36 and 38 through two of the slots 34.

Figure 5:
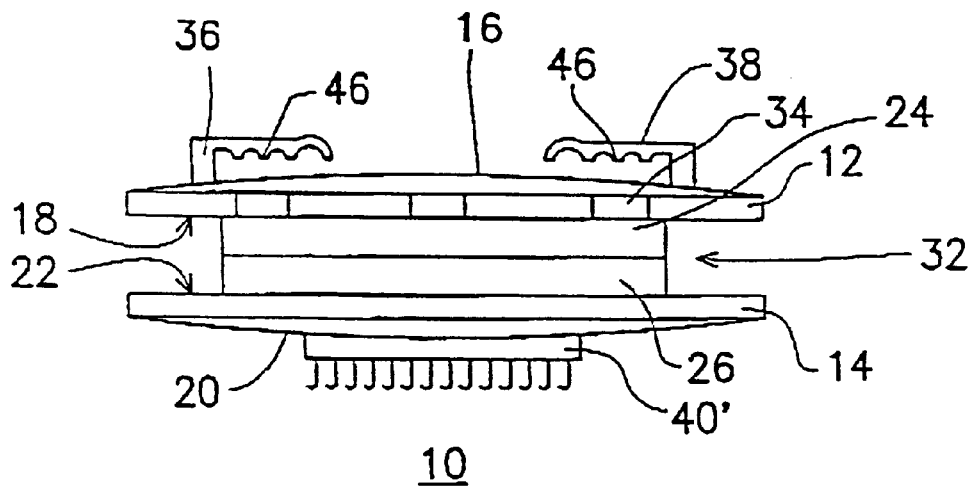
FIG. 5 is a schematic drawing of a front view of a cable-spooling casing for spooling earphone transmission cable according to an embodiment of the invention, originated from FIG. 1.
Figure 6:
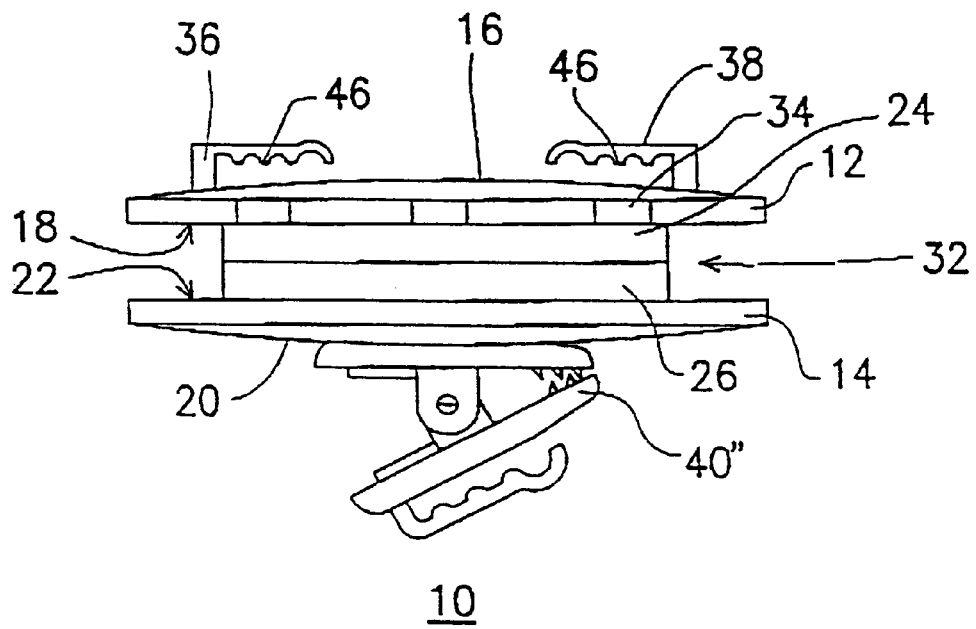
FIG. 6 is a schematic drawing of a front view of a cable-spooling casing for spooling earphone transmission cable according to a second alternative preferred embodiment of the invention, originated from FIG. 1.

Furthermore, on the exterior surface 20 of the guide 14, at least one clamp 40 is installed. Using the clamp 40 to clamp onto any item worn by a user (for example, a leather belt or pockets), the cable-spooling casing 10 can be easily carried. The clamp 40 can be, for example, a sticky tape, a sticky clip or a suction cup. FIG. 5 shows a sticky (or hook) tape 40'. FIG. 6 shows a clip 40". Other reference numbers in FIGS. 5 and 6 have the same meaning as those shown in FIGS. 1–4. In addition, the clips 36 and 38 have a saw-tooth profile 46 or a wavy profile (not shown) for preventing the transmission cable from sliding out of the clipped positions.

When the user decides that too much loose transmission cable is outside the casing, excessive length can be wound back into the cable-spooling casing 10. Since the cable-spooling casing 10 is light and also equipped with a clamp 40, the casing 10 can be fixed onto almost any item worn by the user, such as collar, pocket or belt. With loose transmission cable returned to the cable-spooling casing 10, a user can freely move his or her body without having to worry about becoming entangled with the cable. Thus, earplugs will not be so easily pulled out from the ear causing discomfort and then dropped to the floor resulting in damage.

On the other hand, when the user has finished using the earphones, the entire length of the transmission cable can be wound back into the cable-spooling casing 10 for easy carriage as shown in FIG. 4. No matter how long the length of transmission cable outside the casing, transmission cable near the earphone end 42 and the plugs end 44 can be fixed in position by sliding the cable down the slots 34, and then firmly gripping the cable with clips 36 and 38, respectively.

In summary, one aspect of this invention is the fixing of transmission cable by clips 36 and 38 that have a saw-tooth shaped profile on the exterior surface 16 of the cable-spooling guide 12. Hence, transmission cable near the earphone's end 42 as well as near the plug's end 44 can both be secured. Hence, transmission cable is prevented from slipping from the clips.

Another aspect of this invention is the clamp 40 on the exterior surface 20 of the cable-spooling guide 14. This has the advantage of being able to clamp the cable-spooling casing 10 on any items worn by the user, and hence makes its carriage convenient.

A third aspect of this invention is the introduction of slots 34 on the perimeter of the guide 14 so that the cables emanating from the spool can be fixed in position. Hence, any random movement that might loosen the transmission cable wound up on the spool is prevented.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A cable-spooling casing suitable for winding up a transmission cable, the cable-spooling casing comprising:

a first cable-spooling guide, wherein the first cable-spooling guide includes a first exterior surface and a first interior surface, such that the first interior surface has a first protuberance and the perimeter of the first cable-spooling guide has a plurality of slots;

a second cable-spooling guide, wherein the second cable-spooling guide includes a second exterior surface and a second protuberance, and the second protuberance joins with the first protuberance of the first cable-spooling guide to form a groove for spooling the transmission cable, the first and second protuberances are joined in such a manner that they are not movable against each other;

at least one hook-like clip having an arm and a support mounted on the first exterior surface of the first cable-spooling guide for fixing the position of two end portions of the transmission cable, which is spooled in the groove and leaves the two end portions to be adjustably fixed on the clip through the slots adjacent to the clip, wherein the arm of the clip and the first exterior surface define an opening for receiving the two end portions; and a fixing device formed on the second exterior surface of the second cable-spooling guide for fixing the cable-spooling casing onto an item carried by a user.

2. The cable-spooling casing of claim 1, wherein the first cable-spooling guide including the first protuberance and second cable-spooling guide including the second protuberance are substantially identical except the slots.

3. The cable-spooling casing of claim 1, wherein the first cable-spooling guide and the second cable-spooling guide have different sizes.

4. The cable-spooling casing of claim 1, wherein the first cable-spooling guide and the second cable-spooling guide have an oval shape as viewed in a top view of the first and second cable-spooling guide.

5. The cable-spooling casing of claim 1, wherein the first cable-spooling guide and the second cable-spooling guide have a rectangular shape.

6. The cable-spooling casing of claim 1, wherein the clip has a saw-tooth shaped profile for preventing the transmission cable from slipping out of the clip.

7. The cable-spooling casing of claim 6, wherein the saw-tooth shaped profile includes a wavy profile.

8. The cable-spooling casing of claim 6, wherein the clip includes a first clip with a first arm and first support and a second clip with a second arm and second support, each of the clips adjustably fixes one of the two end portions, wherein the first arm and the second arm are substantially parallel with the first exterior surface and define a first opening for receiving one of the two end portions and a second opening for receiving the other one of the two end portions.

9. The cable-spooling casing of claim 1, wherein the first protuberance corresponds in size to the second protuberance.

10. The cable-spooling casing of claim 1, wherein the fixing device includes a sticky tape.

11. The cable-spooling casing of claim 1, wherein the fixing device includes a clip.

12. The cable-spooling casing of claim 1, wherein the fixing device includes a hook-like clamp.

13. The cable-spooling casing of claim 1, wherein the first and second protuberances have a periphery with an oval-like shape.

14. The cable-spooling casing of claim 8, wherein the first arm of the first clip and the second arm of the second clip are pointing to each other.

15. The cable-spooling casing of claim 1, wherein the transmission cable comprises an earphone transmission cable.

16. A cable-spooling casing suitable for winding up an earphone transmission cable, the earphone transmission cable having an earphone end and a plug end, the cable-spooling casing comprising:

a first cable-spooling guide, wherein the first cable-spooling guide has a first exterior surface and a first interior surface, such that the first interior surface has a first protuberance and the perimeter of the first cable-spooling guide has a plurality of slots;

a second cable-spooling guide, wherein the second cable-spooling guide has a second exterior surface and a second protuberance, and the second protuberance joins with the first protuberance of the first cable-spooling guide to form a groove between the first and second cable-spooling guide for spooling the transmission cable, and the first protuberance is not movable relative to the second protuberance;

a pair of hook-like clips, each of the hook-like clips having an arm and a support mounted on the first exterior surface of the first cable-spooling guide, one of the hook-like clips for fixing the position of the earphone end of the earphone transmission cable spooled in the groove and another of the hook-like clips for fixing the position of the plug end of the earphone transmission cable, leaving the earphone end and the plug end to be adjustably fixed on the clip through the slots adjacent to the clip, wherein the arms of the clips and the first exterior surface define an opening for receiving the earphone end and the plug end; and a fixing device formed on the second exterior surface of the second cable-spooling guide for fixing the cable-spooling casing onto an item carried by a user.

\* \* \* \* \*